US012553588B2

(12) United States Patent
Van Os

(10) Patent No.: US 12,553,588 B2
(45) Date of Patent: Feb. 17, 2026

(54) 3D PRINTED LIGHT FIXTURE

(71) Applicant: SIGNIFY HOLDING B.V., Eindhoven (NL)

(72) Inventor: Jacobus Petrus Johannes Van Os, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/876,883

(22) PCT Filed: Jul. 6, 2023

(86) PCT No.: PCT/EP2023/068671
§ 371 (c)(1),
(2) Date: Dec. 19, 2024

(87) PCT Pub. No.: WO2024/008850
PCT Pub. Date: Jan. 11, 2024

(65) Prior Publication Data

US 2025/0377084 A1 Dec. 11, 2025

(30) Foreign Application Priority Data

Jul. 7, 2022 (EP) .................................... 22183576

(51) Int. Cl.
*F21V 1/26* (2006.01)
*F21V 1/12* (2006.01)

(52) U.S. Cl.
CPC . *F21V 1/12* (2013.01); *F21V 1/26* (2013.01)

(58) Field of Classification Search
CPC .................................... F21V 1/12; F21V 1/16
See application file for complete search history.

(56) References Cited

U.S. PATENT DOCUMENTS

2016/0374431 A1 12/2016 Tow
2018/0154580 A1 6/2018 Mark
2018/0321659 A1 11/2018 Dasappa et al.
2020/0278093 A1* 9/2020 Angenendt ............... F21S 4/24

FOREIGN PATENT DOCUMENTS

WO 2021001392 A1 1/2021
WO 2021089767 A1 5/2021

* cited by examiner

*Primary Examiner* — Sean P Gramling

(57) ABSTRACT

A 3D printed fixture (100) for a luminaire is provided. The 3D printed fixture comprises at least one meshed wall part (110) and at least one solid wall part, wherein the meshed wall part further comprises a plurality of wall segments (112) defining a plurality of apertures (114) extending through the meshed wall part. The solid wall part and the meshed wall part are formed by a plurality of layers (130) stacked on each other in a stacking direction. Each layer forms cross sectional portions (116) of the plurality of wall segments of the meshed wall part and a cross-sectional portion (126) of the solid wall part. For each layer, the sum of the perimeters of the cross-sectional portions of the plurality of wall segments exceeds the perimeter of the cross-sectional portion of the solid wall part.

9 Claims, 3 Drawing Sheets

3D PRINTED LIGHT FIXTURE

CROSS-REFERENCE TO PRIOR APPLICATIONS

This application is the U.S. National Phase application under 35 U.S.C. § 371 of International Application No. PCT/EP2023/068671, filed on Jul. 6, 2023, which claims the benefit of European Patent application Ser. No. 22/183,576.2, filed on Jul. 7, 2022. These applications are hereby incorporated by reference herein.

FIELD OF THE INVENTION

The present disclosure generally relates to the field of 3D printed devices and methods for printing such devices. In particular it relates to a luminaire device manufactured by a 3D printing method.

BACKGROUND OF THE INVENTION 3D printing is a process of manufacturing a physical object from a 3-dimensional digital model, preferably by depositing material in a sequence of stacked layers stacked on top of each other along a stacking direction. Such printing techniques may also be referred to as additive manufacturing. An example of a 3D printing technique is the so-called fused filament fabrication (FFF), or fused deposition modelling (FDM) process, in which a filament of a thermoplastic material is fed through a heated printed extruder head and deposited in a layer-by-layer fashion to form the desired object.

3D printing has been widely incorporated in many industries, such as the manufacturing industry in general and the production of lighting fixtures in particular. However, despite several advantages associated with 3D printing of lighting fixtures, there are challenges to overcome. One challenge concerns delamination of the layers in which the material is added. As each layer commonly is formed by adding molten or at least softened material to an underlying, previously formed and thus solidified layer, stresses may be induced between subsequent layers as the molten material starts to cool down and solidify. The stresses have been observed to be closely related to the material shrinking during the cooling and/or solidification process. The stresses may accumulate within each layer an propagate between adjacent layer of the layer stack, eventually risking to result in warpage and delamination.

Hence, it is an object of the present invention to try to overcome at least some of the deficiencies of the present manufacturing technologies regarding warpage and delamination, and to provide a fixture with an improved mechanical stability and integrity.

SUMMARY OF THE INVENTION

It is of interest to provide a method and a device overcoming, or at least alleviating, the above-mentioned drawbacks.

This and other objects are achieved by providing a fixture and a method having the features defined in the independent claims. Preferred embodiments are defined in the dependent claims.

Hence, according to a first aspect, a 3D printed light fixture for a luminaire is provided. The 3D printed fixture comprises at least one meshed wall part and at least one solid wall part. The meshed wall part comprises a plurality of wall segments defining a plurality of apertures extending through the meshed wall part. The solid wall part and the meshed wall part are formed by a plurality of layers that are stacked on each other in a stacking direction. Each layer forms cross sectional portions of the plurality of wall segments of the meshed wall part and a cross-sectional portion of the solid wall part. For each layer, the sum of the perimeters of the cross-sectional portions of the plurality of wall segments exceeds the perimeter of the cross-sectional portion of the solid wall part.

According to a second aspect, there is provided a method for 3D printing of a light fixture for a luminaire, in which at least one meshed wall part and at least one solid wall part are formed. The meshed wall part comprises a plurality of wall segments defining a plurality of apertures extending through the meshed wall part. The solid wall part and the meshed wall part are formed by adding a plurality of layers stacked on each other in a stacking direction, such that each layer forms cross sectional portions of the plurality of wall segments of the meshed wall part and a cross-sectional portion of the solid wall part. For each layer, the sum of the perimeters of the cross-sectional portions of the plurality of wall segments exceeds the perimeter of the cross-sectional portion of the solid wall part.

Thus, the present invention is based on the idea of balancing the solid wall part with meshed wall portions when forming the 3D printed object to reduce the risk of stress-induced deformations of the fixture or resulting luminaire. In this way, the advantages associated with the meshed designs can be combined with the advantages associated with the solid designs. While solid structures, that is, structures having no openings or apertures, generally exhibit higher mechanical robustness and strength compared to meshed structures, the latter can be employed to reduce the risk of deformations and warpage of the fixture resulting from accumulated internal stresses of the 3D printed material. Further, the solid structures may beneficially exhibit better accuracy in terms of mechanically matching of non-printed parts of the luminaire, such as fitting edges, guidance, closures, rims, and the like. Hence, the present invention provides a combination of two different printing styles, wherein each layer comprises both mesh style wall parts and solid style wall parts.

The present invention is advantageous in that is provides a design rule that can be used for determining a balance between the solid wall part and the meshed wall part for each layer that is printed. The design rule may be determined by observing the perimeters of the cross-sectional portions of the wall segments forming the meshed wall part as well as the cross-sectional portions of the solid wall part for each layer. The inventor has found that by introducing a meshed wall part to the fixture, which is designed such that for each layer the sum of the perimeters of the segments exceeds the perimeter of the solid wall part (as seen in the plane of the layer) design, a beneficial effect is achieved in terms of mechanical stability. This effect is understood to be achieved by the meshed wall part "breaking" the accumulated internal stresses that otherwise risk to propagate through the fixture and eventually lead to warping or other stress-induced deformations and damages.

Additionally, introducing a meshed wall part into the design also allows for improved air circulation and thermal management, as well as a reduced material cost.

The term "light fixture" may be understood as an element or equipment forming part of a luminaire, such as the body into which other parts of the luminaire are fitted. In other examples the light fixture may refer to the complete luminaire. The light fixture may, for instance, be a frame, body or holding structure into which components such as reflectors, light sources or electronic components are fitted.

By "meshed wall part" is meant a part of portion of a wall of the fixture having a plurality of apertures extending through the wall part. Put differently, the meshed wall part may be understood as a portion of the fixture wall formed by a plurality of segments or sections that are arranged in a mesh or network structure. The spacing between individual segments may form regular or irregular apertures. Examples of the aperture shapes include both circular and polygonal shapes, such as quadratic, rectangular and hexagonal shapes.

The meshed wall part may be contrasted with the solid wall part, which refers to a part of the fixture wall having no apertures. In other words, the solid wall part may be understood as having single, connected surface (or, in topology terms, having a surface conforming to a genus 0 surface).

The fixture is a 3D printed object formed in an additive process, in which layers of molten or softened material are added in sequence on top of each other. Each layer has a lateral extension in a plane substantially orthogonal to the stacking direction, and is provided with a certain height or thickness that may vary depending on the raw material and the particular 3D printing method used. It should be noted that a layer may not necessarily be planar, or flat. On the contrary, it may as well extend along a curved plane. The stacking direction, which may be considered to substantially correspond to the normal to the plane, may therefore vary at different points on the plane (i.e., different positions of the layer).

The additive process may be a fused filament fabrication process in which a raw material is melted or at least softened and extruded through a nozzle. The raw material may be provided in the form of a filament material, which is to be understood as a continuous plastic thread that may be spooled into a reel for purpose of storage and printer feeding. In further examples, the material may be provided as pellets or granules instead, and the additive process hence be referred to as a pellet printing process. Examples of materials for such additive processes include thermoplastics such as acrylonitrile butadiene styrene (ABS), polylactic acid (PLA), polyethylene terephthalate (PET), high-impact polystyrene (HIPS), thermoplastic polyurethane (TPU) and aliphatic polyamides (nylon). Non-plastic materials, such as metals (e.g. aluminum) and ceramic material (e.g. glass) are also possible to use with the inventive concept. It will be appreciated that the inventive concept may be implemented with other types of additive manufacturing processes such as for example photopolymerization and powder sintering.

The term "cross-sectional portions" may be defined by the plane along which a layer extends, and thus understood as the topmost portion of wall formed by that specific layer. The above-mentioned perimeters of the segments and the solid wall part may hence be defined by a cross section taken along the plane in which the particular layer is formed.

By "perimeter" of a cross-sectional portion in a layer is understood the continuous line forming the outer boundary of the segment/solid wall part in that particular layer. It will be appreciated that the cross-sectional portions may be hollow or filled with a material, such as the same material as the one forming the rest of the segment or solid wall part.

According to an embodiment, each layer may be formed by adding a material in a plurality of lines arranged adjacent to each other in the main plane of extension of the layer. In different words, each layer may be formed by a plurality of contiguous lines. Each line may be formed by a string of melted or softened printing material provided by feeding a filament of a thermoplastic material through a heated extruder head. The extruder head may move during the deposition so as to arrange the lines in a sequence in which they touch each other. The resulting line, or string has a certain line height (as seen in the stacking direction) and line width (as seen in the main plane of extension of the layer). The line height or thickness may vary between different raw materials and different printing methods.

As the deposited material cools down and solidifies, a shrinkage may occur which results in internal stresses at the interface to the underlying, already solidified material and to neighboring lines in the same layer. These stresses may eventually lead to warpage and delamination. To address these issues, a design rule is proposed which according to an embodiment specifies that each of the plurality of wall segments may be formed by more than two and less than ten lines adjoining each other in the direction orthogonal to the stacking direction (i.e., in the plane of the layer), and further by more than one and less than ten lines adjoining each other in the stacking direction (i.e., in a direction substantially orthogonal to the plane). This design rule hence specifies an interval with a minimum and a maximum number of lines adjoining each other both in the stacking direction and the direction orthogonal to the stacking direction, wherein the lower end point of the interval defines the least number of lines which may be required to form a structure of sufficient mechanical strength, and wherein the upper end point defines the maximum number of lines which can be used while still mitigating the risk of too high accumulated stresses in the material.

It will be appreciated that the lines may have a height to width ratio (wherein the height is seen in the stacking direction and the width is seen the plane of the layer) that differs from 1, such as 0.1 to 0.9. In different words, each line may be up to 10 times wider compared to its height. Alternatively, the height in the stacking direction may exceed the width in the plane of the layer.

According to some embodiments, the meshed wall part is formed by wall segments that are elongated and interconnected to each other at interconnection points to form the meshed structure. The spacing between two neighboring interconnection points may be formed by more than one and less than ten lines adjoining each other in the length direction of the segment. Similarly to the design rule mentioned above, the length constraints of the segments (i.e., the spacing between the interconnection points) may be employed to mitigate the build-up of stresses and hence reduces the risk of stress-induced damages such as delamination and warpage.

According to an embodiment, the fixture may be elongated, forming (at least part of) a linear luminaire. The fixture may for instance have a length to width ratio exceeding two, such as exceeding five, such as exceeding ten. It may be particularly beneficial to implement the present invention in a linear context, as these designs tend to be particularly sensitive to warpage and other form-related deformations accumulating along the length of the fixture.

In further examples the luminaire may be a pendant luminaire.

According to some embodiments, the fixture may form a housing comprising at least two side walls, wherein a first one of the side walls is formed of the solid wall part and the other one of the side walls is formed of the meshed wall part. In case the luminaire is an elongated luminaire, such as a linear luminaire, the at least two side walls may extend along the length of the fixture.

Further objectives of, feature of, and advantages with, the present invention will become apparent studying the following detailed disclosure, the drawings and the appended claims. Those skilled in the art will realize that different features of the present invention can be combined to create embodiments other than those described in the following.

BRIEF DESCRIPTION OF THE DRAWINGS

This and other aspects of the present invention will now be described in more detail with reference to the appended drawings showing embodiment(s) of the invention.

DETAILED DESCRIPTION

Figure 1:
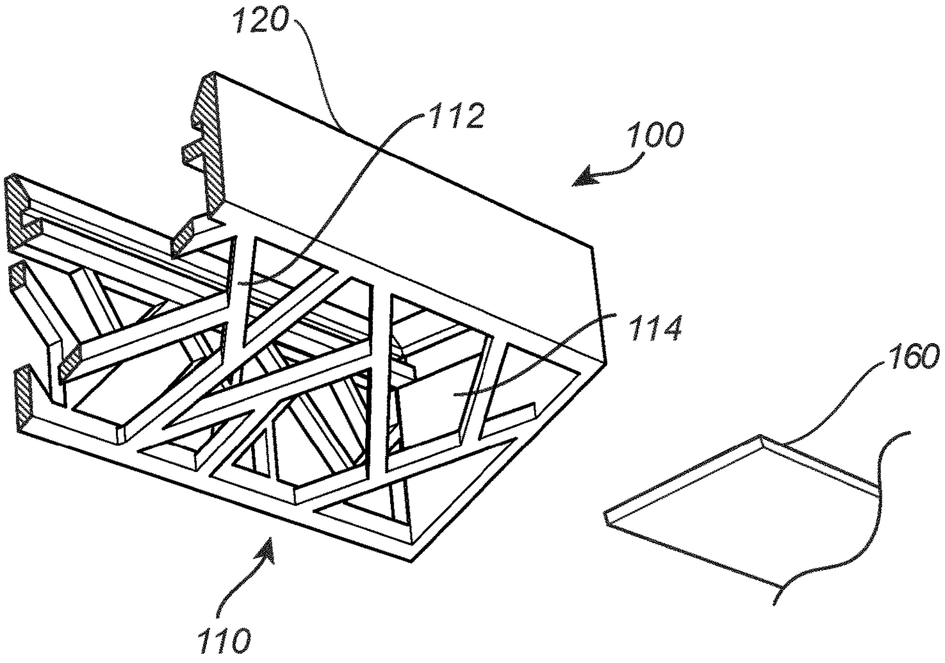
FIG. 1 shows a fixture comprising at least one meshed wall part and at least one solid wall part according to an exemplifying embodiment of the present invention.

Referring to FIG. 1, there is shown a 3D printed fixture 100 according to an exemplifying embodiment of the present invention. The fixture in FIG. 1 comprises at least one meshed wall part 110 and at least one solid wall part 120. The at least one meshed wall part 110 comprises a plurality of wall segments 112 arranged in a mesh-like structure, thereby defining a plurality of apertures 114 extending through the meshed wall part 110. In contrast to the meshed wall part 110, the solid wall part 120 has a continuous or connected surface without any apertures.

The fixture 100 may be formed in an additive manufacturing process, such as a fused filament fabrication (FFF), or fused deposition modelling (FDM) process, in which raw material is added in a layer-by-layer fashion as will be discussed in further detail in connection with e.g. FIG. 4. The meshed wall part 110 and solid wall part 120 may be formed of the same material or by different materials. Examples of materials commonly used for 3D printing include a thermoplastic materials, such as acrylonitrile butadiene styrene (ABS), polylactic acid (PLA), polyethylene terephthalate (PET), high-impact polystyrene (HIPS), thermoplastic polyurethane (TPU) and aliphatic polyamides (nylon).

The fixture 100 illustrated in FIG. 1 forms part of a linear luminaire, and is more specifically arranged to form a frame holding functional elements of the luminaire. In the present example, the fixture 100 is configured to receive printed circuit boards (PCBs) 160. The PCBs holds a plurality of light sources, such as LEDs, as well as electronic circuits for controlling and operating the light sources (not shown in present figure). The fixture 100 may be arranged to allow the PCBs 160 to slide into the fixture. In the present example, the fixture 100 may be considered to form an elongated housing at least partly enclosing the functional elements of the luminaire. It will be appreciated that this luminaire design requires the fixture 100 to have a relatively high mechanical stability and form integrity, as it otherwise may be difficult to fit the PCBs 160 into the fixture 100. Warping may for instance cause the PCBs 160 to get stuck as they are being slid into the fixture 100. Further, if PCB's are slid into a curved guidance, stresses may arise in the PCBs because of bending, which risks resulting in non-functioning PCBs in terms of light beam generation and life-time reductions.

In FIG. 1 this issue is addressed by combining the solid wall part 120 with a meshed wall part 110 according to a design rule that will be discussed below with reference to FIGS. 3-5. While solid print designs such as the one represented by the solid wall part 120 may provide objects having a relatively high mechanical strength, they also tend to suffer from stress-induced damages originating from internal stresses at the interface between adjoining material lines and adjoining layers. The internal stresses may accumulate and propagate through solid parts of the 3D printed object. Beneficially, the internal stresses may be reduced by introducing meshed wall parts 110, comprising apertures 114 “breaking” the accumulation and propagation of internal stresses through the material forming the wall part. The meshed wall parts 110 may, as shown in FIG. 1, form entire sidewalls of the fixture 100. Thus, the fixture 100 may comprise a first elongated wall part 120 formed by a solid print design and a second elongated wall part 110, parallel to the first one, formed by a meshed print design.

Figure 2:
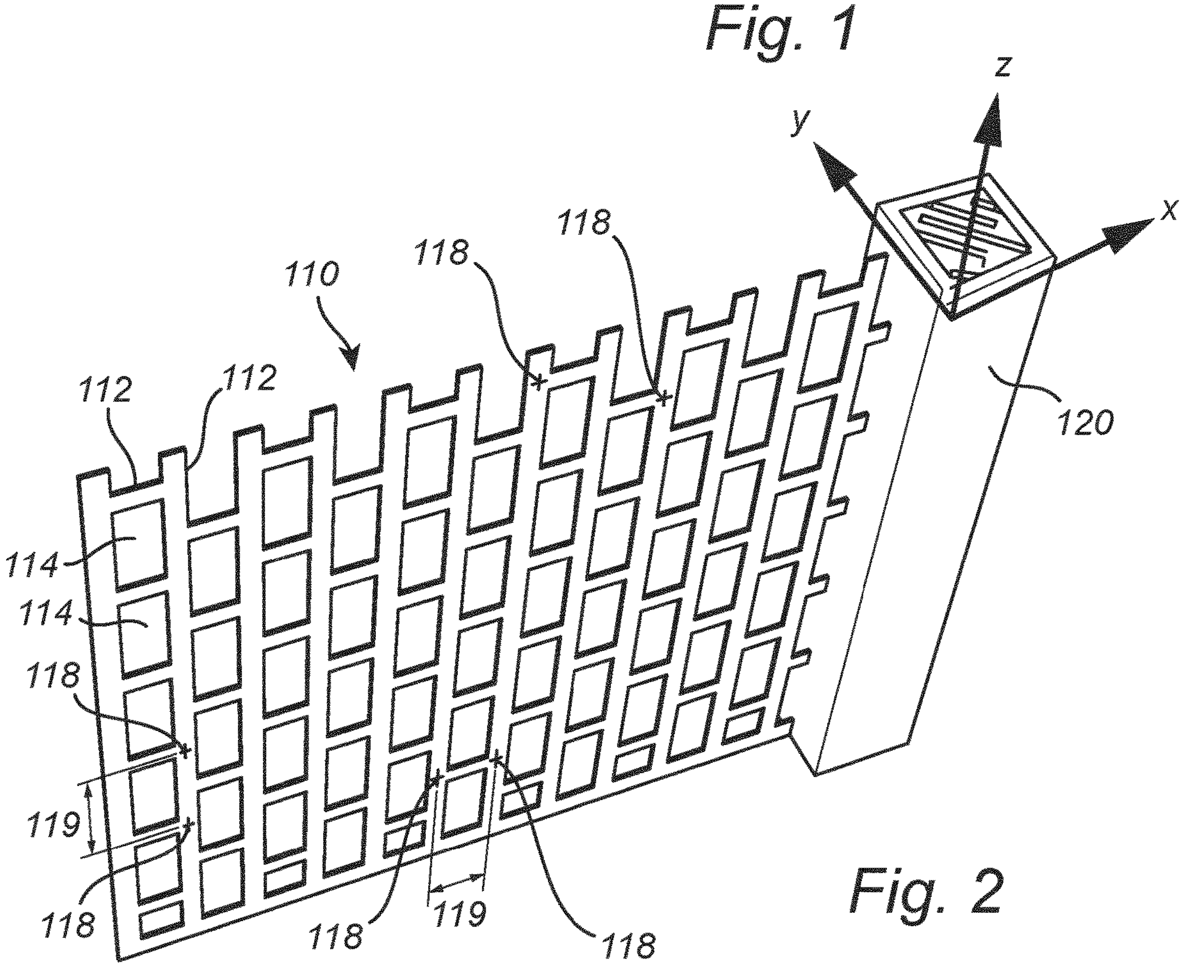
FIG. 2 shows a fixture according an exemplifying embodiment of the present invention, FIG. 3 schematically shows cross-sectional portions of a meshed wall part and a solid wall part according to an exemplifying embodiment of the present invention.

FIG. 2 schematically illustrates a fixture 100 according to an exemplifying embodiment of the present invention, comprising a meshed wall part 110 and a solid wall part 120 similar to the ones discussed above in connection with FIG. 1. Thus, the meshed wall part 110 and the solid wall part 120 may be manufactured in a layer-by-layer fashion, wherein each layer defines a cross-sectional portion of both the solid wall part 120 and the segments 112 forming the meshed layout of the meshed wall part 110. Each layer may extend in the x-y plane illustrated in the present figure, and be stacked on top of each other in the z-direction.

In contrast to the meshed wall part 110 in FIG. 1, the present meshed wall part 110 comprises a regular pattern of rectangular apertures 114. The plurality of wall segments 112 are in FIG. 2 elongated and interconnected to each other at interconnection points 118 to form the mesh. For each individual wall segment 112, two neighboring interconnection points 118 are separated by a spacing 119.

Figure 3:
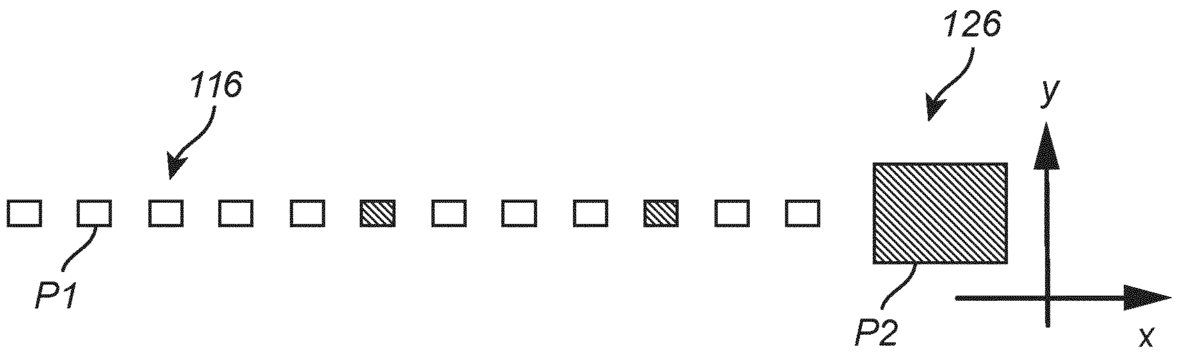

A design rule determining the balance between the meshed wall part 110 and the solid wall part 120 for each layer will now be exemplified with reference to FIG. 3, showing a cross section taken along one of the layers forming the fixture 100 shown in FIG. 2. The cross section is hence taken orthogonal to the stacking direction z. The layer comprises a plurality of cross-sectional portions 116 of the plurality of wall segments 112 of the mesh wall part 110 as well as a cross-sectional portion 126 of the solid wall part 120 of the fixture 100. As already mentioned, each layer (such as the one coinciding with the cross section in FIG. 3) comprises cross sectional portions of both the plurality of wall segments 112 of the meshed wall part 110 and the solid wall part 120. Each of cross-sectional portions 116 of the plurality of wall segments 112 of the meshed wall part 110 has perimeter P1, defining the outer boundary of each segment in the particular layer shown in FIG. 3. Similarly, the cross-sectional portion 126 of the solid wall part 120 has perimeter P2, defining the outer boundary of the solid wall part in the layer illustrated in the present figure.

The design rule may be expressed as an inequality which may be applied for each layer of the fixture 100. According to this inequality, the sum of the perimeters P1 of the cross-sectional portions 116 should exceed the perimeter P2 of the cross-sectional portion 126 of the solid wall part 120.

Thus, if there are n wall segments 112 in a layer, the perimeter P2 of the solid wall part 120 may not exceed n times P1, i.e., n×P1>P2. It will be appreciated that the sum of the perimeters P1 of the meshed wall part 110 may vary between different layer, as long as the sum exceeds the perimeter P2 of the solid wall part 120 in the same layer. Should the perimeter P2 of the solid wall part exceed this value, the number of segment 112 in the meshed wall part 110 may be increased to balance the distribution between the solid wall part 120 and the meshed wall part 110.

In FIG. 3 the cross-sectional portions 116 of the plurality of wall segments 112 and the cross-section portion 126 of the solid wall part 120 have a regular shape, for example, a rectangular shape. This is merely for illustrative purposes, and it will therefore be appreciated that other shapes also are possible, as illustrated below in connection with FIG. 6. The cross sections 116, 126 may for example conform to circles, ellipses, hexagons, and the like, as well as irregular shapes and patterns.

Figure 4:
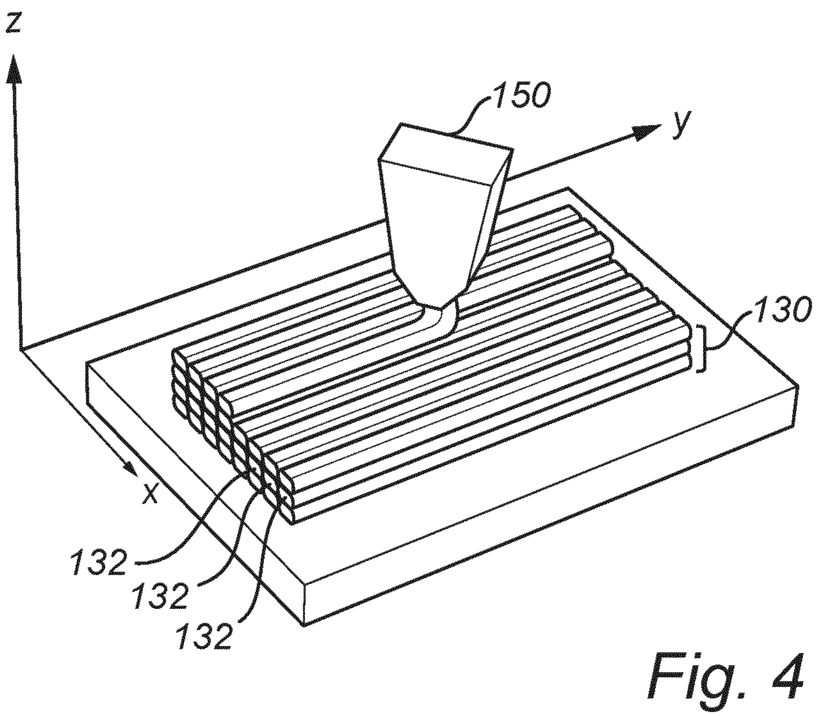
FIG. 4 shows the formation of a part of a fixture according to an exemplifying embodiment of the present invention, FIG. 5 a fixture according to an exemplifying embodiment of the present invention.

FIG. 4 shows an example of a 3D printing technique employed for forming a wall part, such as a meshed wall part 110 and or a solid wall part 120, of a fixture 110 according to an embodiment. The fixture 100 may be similarly configured as any of the fixtures discussed above with reference to FIGS. 1-3. The material may be added in a stack of consecutive layers 130, wherein each layer has a main plane of extension along the x-y plane illustrated in the present figure and a thickness in the z-direction. The layers may be added one-by-one in a sequential manner along the stacking direction (in the present example coinciding with the z-direction). Each layer may be formed of a plurality of lines, or material strings, added next to each other in an adjoining manner. Beneficially, the material is added in a melted or at least softened state to promote adhesion to underlying layers and neighboring lines.

The 3D printing technique may be a fused filament fabrication process in which a raw material, such as a filament material, is extruded through a nozzle 150 moving in the x-y plane to deposit the material in a plurality of lines or strings 132. The number of lines 132 touching each other in each plane, and also in the stacking direction, may be determined by a design rule according to an exemplary embodiment of the present invention. This is based on the insight that the strength and stability of the meshed wall part 110, well as the internal stresses accumulated in the same, depend on the number of adjoining lines 132 used to form the cross-sectional portions 116 of the segments in each layer 130. With too few adjoining lines 132 it may be difficult to provide a sufficient mechanical strength, and with too many adjoining lines 132 stress may be induced in the material.

In an exemplary embodiment, each of the plurality of wall segments 112 may be formed by more than two and less than ten lines 132 adjoining each other in the direction orthogonal to the stacking direction, and further by more than one and less than ten lines 132 adjoining each other in the stacking direction. When the plurality of lines 132 of melted or softened printing material are arranged adjacent to each other and starts to cool down, an internal stress is introduced because of the material shrinking. By limiting the number of touching lines 132 when forming the meshed wall part 110, the stress in the material may be reduced and potential problems with delamination and warpage mitigated.

Figure 5:
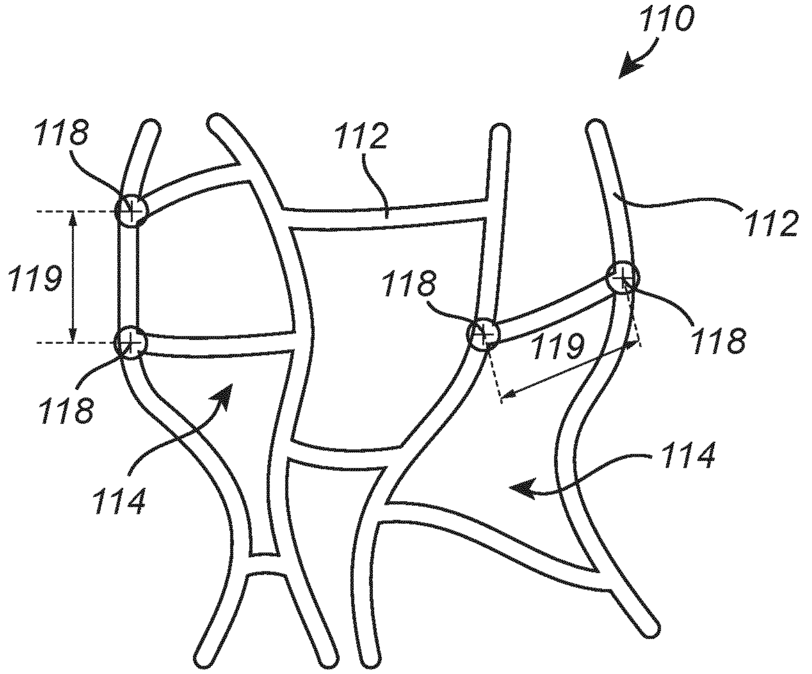

FIG. 5 shows a meshed wall part 110 of a fixture 100 according to an embodiment, which may be similarly configured as the fixtures disclosed in FIGS. 1-4. Thus, the segments 112 of the meshed wall part 110 may be formed by adding material in a plurality of layers 130 similar to what is described above in connection with FIG. 4. The segments 112 are interconnected at interconnection points 118, which may be spaced apart by a spacing 119 corresponding to more than one and less than ten lines 132 adjoining each other in the length direction of the segment 112. It will be appreciated that the lines may adjoin each other in the plane coinciding with the layer 130, in the stacking direction substantially orthogonal to the plane, or a combination of both, depending on the orientation of the particular segment 112. The length of a segment 112 may thus be defined by the number of lines 132 touching each other in the length direction of the segment. As shown in FIG. 5, the segment 112 may not necessarily extend along a straight line. It may as well have a curved or bent shape. In such case, the length of the segment 112 may still be defined by the number of lines adjoining each other along the curved line.

Figure 6:
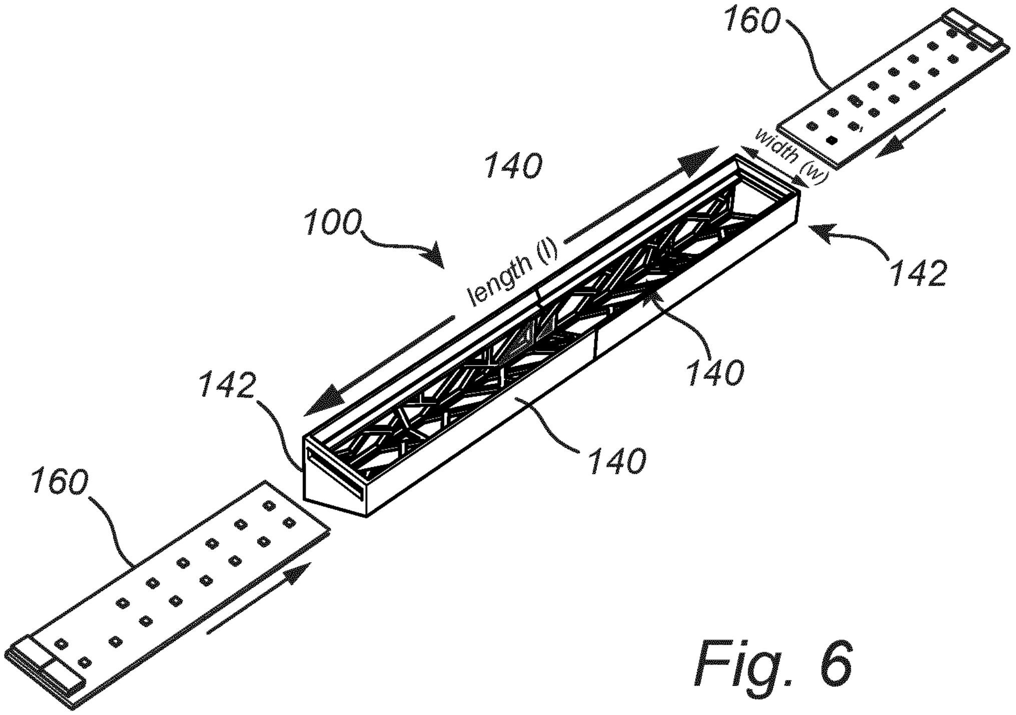
FIG. 6 shows a fixture for a linear luminaire according to an exemplifying embodiment of the present invention.

FIG. 6 shows an exemplary embodiment of a fixture 100 which may be similar to the one in FIG. 1. The fixture 100 forms an elongated housing comprising at least two side walls 140 extending in parallel along the length direction of the housing, as well as two end walls 142 arranged at opposite end portions of the elongated housing 100. A first one of the side walls 140 is formed of a solid wall part 120 and the other one of the side walls 140 is formed of a meshed wall part 110. Similar to the above-mentioned fixtures, the fixture 100 may be formed by a 3D printing process in which a stack of consecutive layers are arranged on top of each other. In the present example, the stacking direction may coincide with the length direction of the housing 100. Hence, for each cross section through the sidewalls 140, a sum of the perimeters of the cross-sectional portions of meshed wall part 110 exceeds the perimeter of the cross-section portion(s) of the solid wall part(s). The housing may for example form part of a linear luminaire, having a length l exceeding the width w by a factor two or more. In some examples, the length to width ratio exceeds 5, or even 10.

The housing 100 may allow at least one light source, for example, a LED, a light bulb, a light tube and/or a series of light sources, such as a strip of LEDs to be accommodated in the fixture 100. In the present example the LEDs are attached to a PCB 160 which can be slid into a receiving structure in the housing 100.

The person skilled in the art realizes that the present invention by no means is limited to the preferred embodiments described above. On the contrary, many modifications and variations are possible within the scope of the appended claims. For example, the fixture 100 may be configured to form part of, or form, other types of luminaries than the linear ones.

The invention claimed is:

1. A 3D printed fixture for a luminaire, comprising:

at least one meshed wall part having a plurality of wall segments defining a plurality of apertures extending through the meshed wall part, and at least one solid wall part, wherein the solid wall part and the meshed wall part are formed by a plurality of layers stacked on each other in a stacking direction, such that each layer forms cross-sectional portions of the plurality of wall segments of the meshed wall part and a cross-sectional portion of the solid wall part, wherein, for each layer, the sum of the perimeters of the cross-sectional portions of the plurality of wall segments exceeds the perimeter of the cross-sectional portion of the solid wall part, wherein each layer is formed by a material added in a plurality of lines arranged adjacent to each other in a main plane of extension of the layer, and wherein each of the plurality of wall segments is formed by more than two and less than ten lines adjoining each other in the direction orthogonal to the stacking direction, and further by more than one and less than ten lines adjoining each other in the stacking direction.

2. The fixture according to claim 1, wherein each of the plurality of wall segments is elongated and interconnected to each other at interconnection points to form the meshed wall part.

3. The fixture according to claim 2, wherein for each of the plurality of wall segments a spacing between two neighboring interconnection points is formed by more than one and less than ten lines adjoining each other in the length direction.

4. The fixture according to claim 1, wherein the fixture is elongated.

5. The fixture according to claim 4, wherein the fixture has a length to width ratio exceeding two, such as exceeding five, such as exceeding ten.

6. The fixture according to claim 1, wherein the fixture forms a housing comprising at least two side walls, wherein a first one of the side walls is formed of the solid wall part and the other one of the side walls is formed of the meshed wall part.

7. The fixture according to claim 6, wherein the fixture is elongated, and wherein the two side walls extend along a length direction of the fixture.

8. A method for 3D printing of a fixture for a luminaire, comprising:

forming at least one meshed wall part having a plurality of wall segments defining a plurality of apertures extending through meshed wall part, and forming at least one solid wall part, wherein forming the solid wall part and the meshed wall part comprises adding a plurality of layers stacked on each other in a stacking direction, such that each layer forms cross-sectional portions of the plurality of wall segments of the meshed wall part and a cross-sectional portion of the solid wall part, wherein, for each layer, the sum of the perimeters of the cross-sectional portions of the plurality of wall segments exceeds the perimeter of the cross-sectional portion of the solid wall part, wherein each layer is formed by adding a material in a plurality of lines arranged adjacent to each other in a main plane of extension of the layer, and wherein each of the plurality of wall segments is formed by more than two and less than ten lines adjoining each other in the direction orthogonal to the stacking direction, and further by more than one and less than ten lines adjoining each other in the stacking direction.

9. The method according to claim 8, wherein the solid wall part and the meshed wall part are formed by means of fused deposition modelling, FDM.

* * * * *